US005108214A

United States Patent [19]

Milam

[11] Patent Number: 5,108,214

[45] Date of Patent: Apr. 28, 1992

[54] COUPLING DEVICE WITH IMPROVED THERMAL INTERFACE

[75] Inventor: Malcolm B. Milam, Laurel, Md.

[73] Assignee: The United States of America as represented by the Administrator of the National Aeronautics and Space Administration, Washington, D.C.

[21] Appl. No.: 714,814

[22] Filed: Jun. 13, 1991

[51] Int. Cl.[5] .................... F16C 9/00

[52] U.S. Cl. .................... 403/28; 403/404; 285/381; 411/909; 292/DIG. 66

[58] Field of Search .................... 403/404, 28; 285/381; 411/909; 292/DIG. 66

[56] References Cited

U.S. PATENT DOCUMENTS

| | | | |
|---|---|---|---|
| 1,623,093 | 4/1927 | Chapin et al. | 292/DIG. 66 |
| 3,783,429 | 1/1974 | Otte | 411/909 X |
| 4,294,559 | 10/1981 | Schutzler | 403/28 |
| 4,872,584 | 10/1989 | Sakai | 220/201 |

OTHER PUBLICATIONS

"Shape-Memory-Effect Alloys: Basic Principles" vol. 6, 1986, Pergamon Press.

*Primary Examiner*—Andrew V. Kundrat
*Attorney, Agent, or Firm*—R. Dennis Marchant; John R. Manning; Paul S. Clohan

[57] ABSTRACT

A coupling device with a thermal interface occuring along a curved vertical surface is disclosed. One curved surface is on a cold pin extending from a "cold" object and the other curved surface is on a hot pin extending from a "hot" object. The cold pin is fixed and does not move while the hot pin is a flexible member and its movement towards the cold pin will bring the two curved surfaces together forming the coupling and the thermal interface. The actuator member is a shape-memory actuation wire which is attached between the hot pin and the hot object. By properly programming the actuation wire, heat from the hot object will cause the actuation wire to move the hot pin towards the cold pin forming an effective thermal interface. The shape-memory actuation wire is made from a shape-memory-effect alloy such as Nitinol.

14 Claims, 6 Drawing Sheets

COUPLING DEVICE WITH IMPROVED THERMAL INTERFACE

ORIGIN OF THE INVENTION

The invention described herein was made by an employee of the U.S. Government, and may be manufactured and used by or for the Government for governmental purposes without the payment of any royalties thereon or therefor.

TECHNICAL FIELD

This invention relates to devices for joining objects together, and in particular, mechanical couplings, fluid couplings and other such couplings designed to have a thermal interface.

BACKGROUND ART

In order to pass acceptable amounts of heat across a thermal interface, tremendous amounts of pressure must be applied. This creates large action and reaction forces and drives the structural overhead weight up considerably. To distribute the load evenly, prior art devices had complex mechanisms with complex load paths. And in a blind mate application, the reaction forces will drive the structural weight up and, correspondingly, the required latch strength up. In order for the thermal interface to function efficiently, prior art devices tended to have large areas of contact on the thermal interface. These areas of contact were also required to be very smooth. Prior art devices also had no acceptable way to get the heat to or away from the thermal interface. In effect, the devices were large and heavy, and they did not successfully compete, with respect to weight and volume, with a fluid coupling.

In fluid couplings, a disadvantage is the spillage of fluid when the coupling is mated and de-mated, and the couplings can leak and/or cause contamination. Prior art fluid couplings have elaborate valve schemes to ensure that fluid does not spill or leak on operation of the coupling. Prior art fluid couplings also have elaborate seals or o-rings to help prevent leakage, and tight alignment tolerances on mating. In the prior art, it was very difficult to design items with tight alignments over the distance required to mate the fluid coupling. Many of the prior art fluid couplings require a constant force to maintain coupling mating or to mate the coupling. This force drives the mounting structural weight up to react to the mating force. For safety, some prior art fluid couplings also required sensors and ports to verify operation before allowing fluid to pass.

Other methods for thermal control, such a fluid regulators or electrical heaters, were complex and heavy or required electrical power, a control system, and sensors.

STATEMENT OF THE INVENTION

It is therefore the primary object of the present invention to provide a simple, reliable, and lightweight coupling that will also have an efficient thermal interface.

A further object of the invention is to provide a coupling that is capable of blind mate with little or no insertion forces.

Another object of the invention is to provide a coupling that acts as a thermal regulator to maintain a constant temperature on one side of the coupling.

A still further object of the invention is to increase the available surface area of a coupling thus providing a larger area for the conduction of heat across the thermal interface.

Another object of the invention is to provide a fluidic coupling that has no fluid passing across the interface, thus reducing the likelihood of leaks and contamination.

The foregoing objects are achieved by utilizing, as in the prior art, a hot area (at an elevated temperature as compared to a cold area) with a need to remove excess heat from the hot area to a cold area. In my device, the thermal interface will occur not on a planar horizontal surface, but along a non-planar vertical surface, which will reduce the reaction forces and increase the thermal conductivity of the device. One non-planar surface is a surface on a cold pin extending from the cold area and the other non-planar surface is a surface on a hot pin extending from the hot area. The cold pin is fixed and does not move while the hot pin is a flexible member and its movement towards the cold pin will bring the two non-planar surfaces together forming the thermal interface. The actuating member for my device is a shape-memory actuation wire which is attached through an aperture to the hot pin and through another aperture to an actuation wire retainer. By properly programming the actuation wire, heat from the hot area will cause the actuation wire to bend the hot pin towards the cold pin forming the coupling and desired thermal interface. The shape-memory actuation wire is made from a shape-memory-effect alloy such as Nitinol.

DETAILED DESCRIPTION OF THE INVENTION

Figure 1:
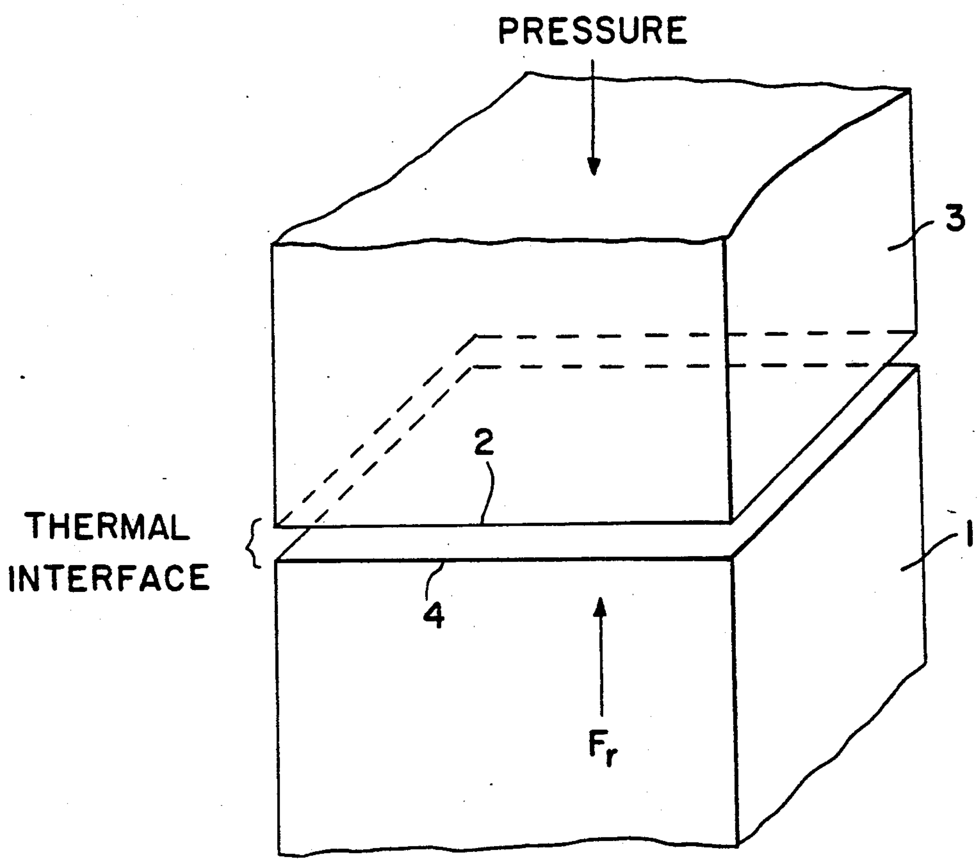
PRIOR ART FIG. 1
FIG. 1 is a perspective view of a prior art thermal interface.

A typical prior art thermal interface is shown in FIG. 1. The upper portion represents a volume of material at an elevated temperature from which excess or waste heat is to be removed, which I will call hot plate 3 for the sake of illustration, and the lower portion represents a volume of material at a reduced temperature to which the excess or waste heat is to be removed to, which I will call cold plate 1, i.e., volume 1 represents a heat sink for volume 3. Thus FIG. 1 is merely a schematic representation of the physics and thermodynamics involved in any prior art thermal transfer or heat sink device that utilizes a more or less planar area to transfer heat from one volume of material to another volume of material. Thus when hot plate 3 and cold plate 1 are brought together along planar surface 2 and planar surface 4, the mating of surface 2 and 4 will form a thermal interface along this boundary as shown. In order for effective transfer of heat from hot plate 3 to cold plate 1 to take place, a fairly large amount of pressure is required, and is represented by the downward pointing arrow marked "pressure". This downward pressure will invoke an upward reaction force within cold plate 1, and is shown by the upward pointing arrow marked $F_r$. This aspect of prior art thermal interfaces, i.e., large downward pressure with a correspondingly large upward reaction force, is one of the significant disadvantages of this type of thermal interface, as was stated above. It can thus be appreciated that this type of thermal interface is not suitable when the structures involved will not accommodate these large reaction forces, such as applications in outer space where weight is of paramount concern.

Figure 2:
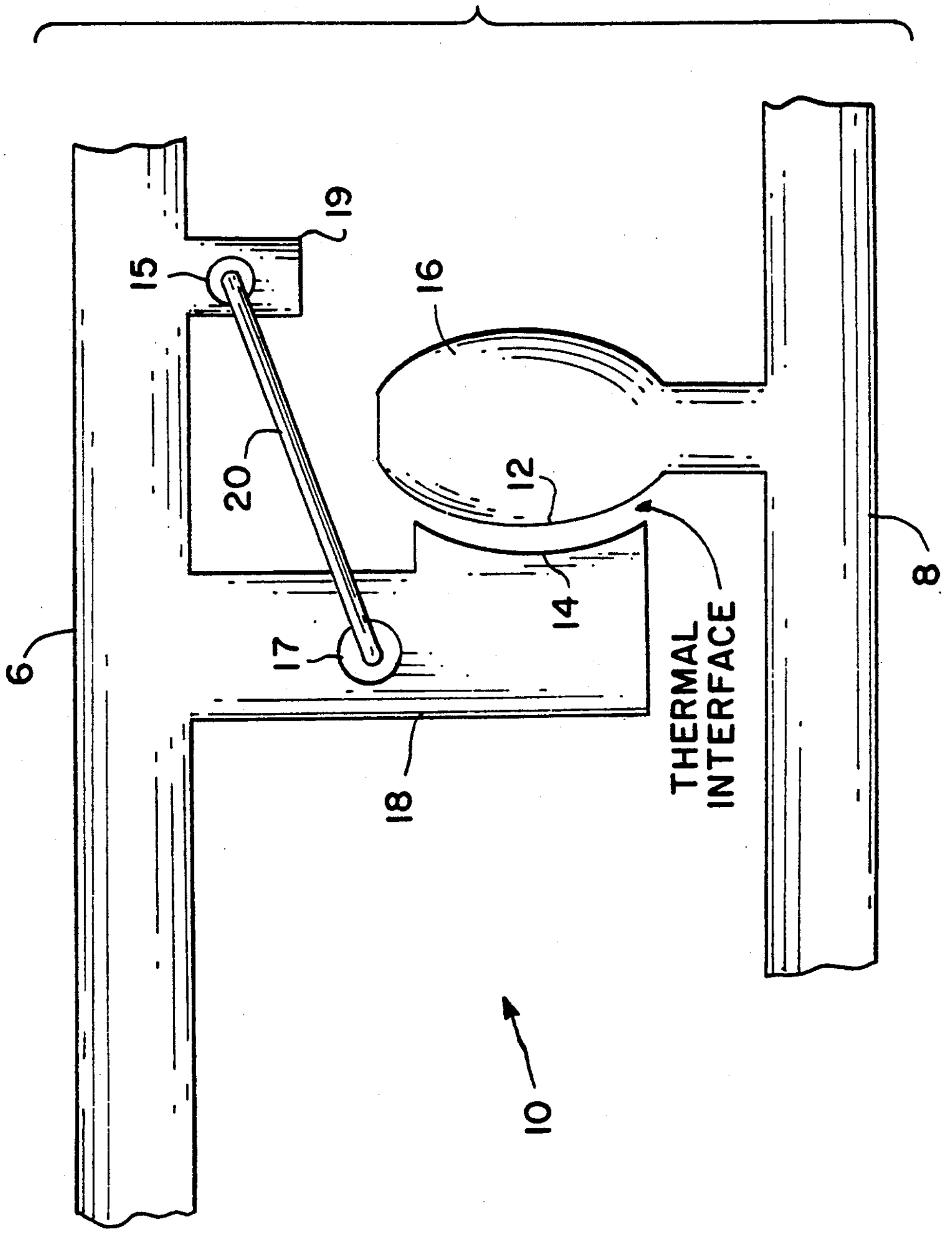
FIG. 2 is a front view of a coupling device according to the teachings of the present inventive concepts.

Shown now in FIG. 2 is a front view of a coupling device 10 according to the teachings of the present inventive concepts. As in the prior art, object 6 (hot plate) will be at an elevated temperature compared to object 8 (cold plate), and coupling device 10 is used not only to join objects 6 and 8 but also to remove excess heat from hot plate 6 to cold plate 8. The temperature of hot plate 6 will become elevated by some means, e.g. the dissipation of electrical current, mechanical friction, radiation, by operation of an instrument or device, etc. In coupling device 10, the thermal interface does not occur on a planar horizontal surface, as in the prior art, but along a non-planar vertical surface, which will reduce the reaction forces and increase the thermal conductivity of coupling device 10. As shown in FIG. 2, the thermal interface will occur when arcuate surface 12 and arcuate surface 14 are brought together. Although an arcuate surface shape is shown for surfaces 12 and 14, any non-planar surface shape could be used. Surface 12 is a part of cold pin or ridge 16 and surface 14 is a part of hot pin or tine 18. Cold pin 16 is a protrusion from cold plate 8, is rigid, and therefore does not move, while hot pin 18 is fastened on a part of hot plate 6 and is a cantilevered member and also a flexible member, and its movement towards cold pin 16 will bring surface 12 and surface 14 together joining objects 6 and 8 together and forming a thermal interface. In coupling 10, for every cold pin 16 there is a corresponding or respective hot pin 18, and therefore a corresponding or respective surface 14 for every surface 12; e.g., if coupling 10 has ten cold pins 16, then it also has ten hot pins 18. The actuating member for coupling device 10 is a shape-memory actuation member 20, which can be a continuous oval wire and attached through aperture 17 to hot pin 18 and through aperture 15 to actuation member retainer 19. By properly programming actuation member 20, heat from hot plate 6 will cause member 20 to contract and bend hot pin 18 towards cold pin 16, joining hot plate 6 to cold plate 8 and forming the desired thermal interface. Shape-memory actuation member 20 is made from a shape-memory-effect alloy such as Nitinol. When an ordinary metal is strained beyond its elastic limit, permanent deformation of the material is produced. For most metals, this yield point corresponds to a fraction of a percent strain; any strain beyond this is defined as plastic deformation and is expected to remain. For example, if an extensively kinked metal wire were heated it would not straighten out spontaneously. Yet this is exactly what certain metallic alloys are able to do. If one of these alloys is deformed (below a critical temperature, with a limit of about 10% strain), it will recover its original unbent shape when it is reheated. The reheating "reminds" the alloy that it prefers a different crystal structure and associated shape at higher temperature. This unusual behavior has been termed the shape-memory-effect . Shape-memory-effect alloy is a common feature of most alloys which are susceptible to a martensitic transformation. Typical shape-memory-effect alloy compositions are given below in Table 1. Although the shape-memory-effect has recently been widely publicized for Nitinol (Ti-Ni) alloys, historically the shape-memory-effect was first extensively studied in an alloy of gold and cadmium. It is the shape-memory-effect in Nitinol, however, that has stimulated widespread interest in its potential application. For example, Nitinol has been used in orthopedic devices, vena cava filters, artificial hearts and for an intracranial aneurism clip. The shape-memory-effect programming sequence of the alloys is well understood in the art and requires no further discussion here.

TABLE 1

| Typical shape-memory-effect alloy compositions (wt %) |
|---|
| Au—(34-36%) Cd |
| (40-62.8%) Au—(10.5-27%) Cu—(26.6-33%) Zn |
| Cu—(38-40%) Zn |
| Cu—(20-32%) Zn/Al |
| Cu—17% Zn—7% Al |
| Cu—44% Al |
| Cu—34.5% Zn—0.9% Si |
| Cu—(14-15%) Al—3% Ni |
| Cu—25% Sn |
| Ti—(55-58%) Ni |
| (45-46%) Ti—(≦22%) Cu—Ni (balance) |
| 45% Ti—(≦8%) Co—Ni (balance) |
| Ni—26.5% Al |

Figure 3:
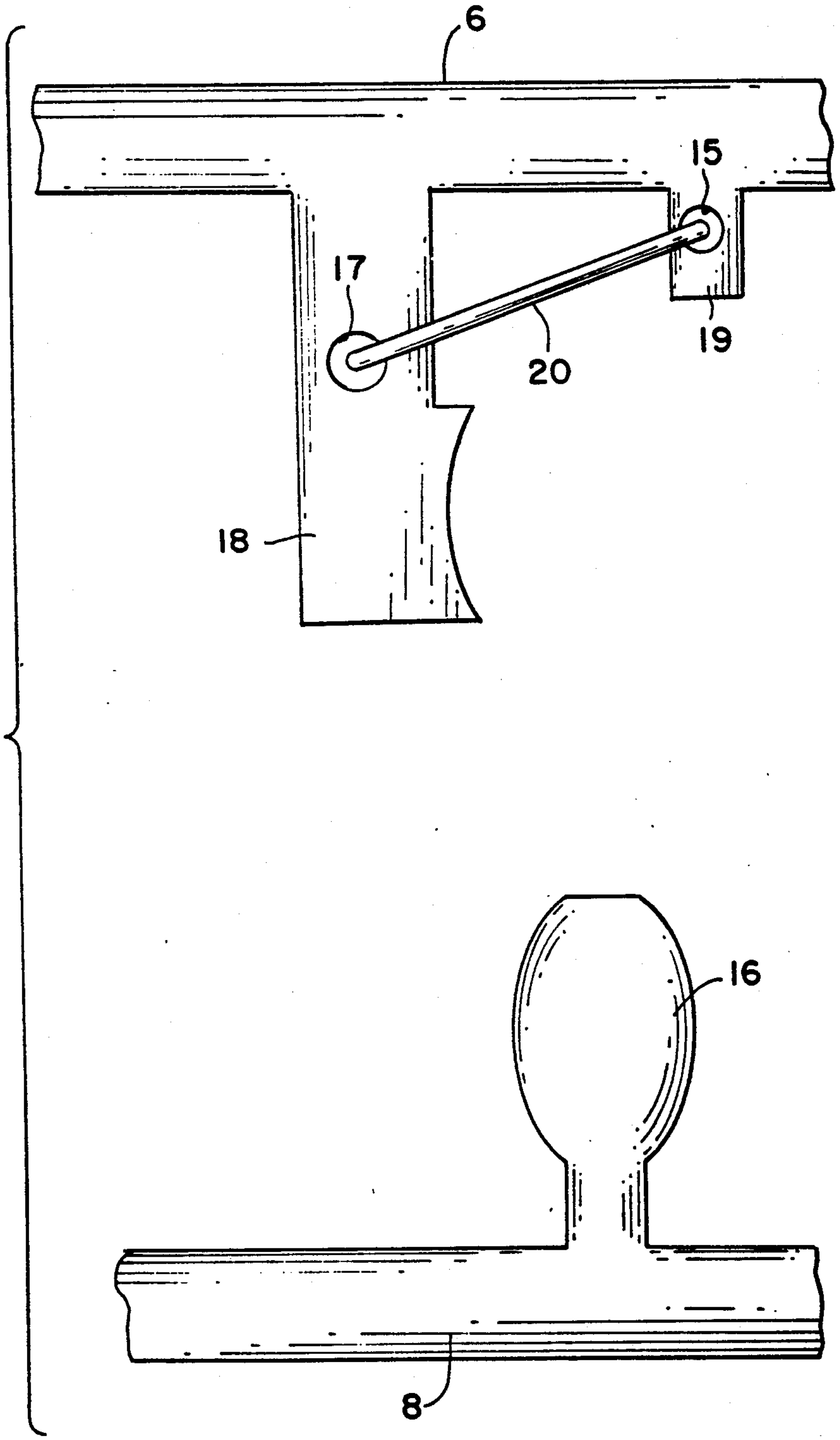
FIG. 3 is a front view of a coupling device according to the teachings of the present inventive concepts well prior to mating.
Figure 4:
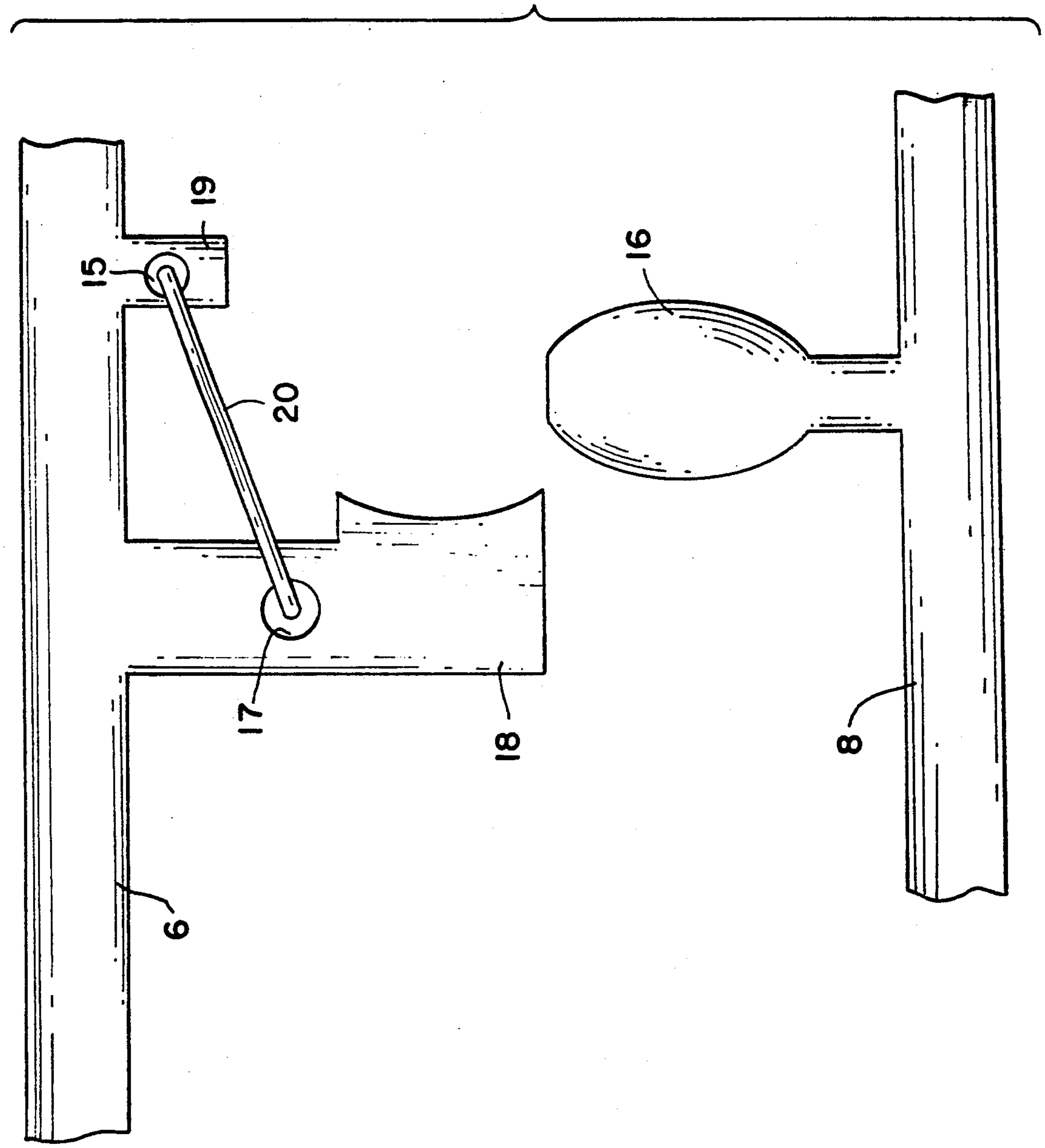
FIG. 4 is a front view of a coupling device according to the teachings of the present inventive concepts just prior to mating.
Figure 5:
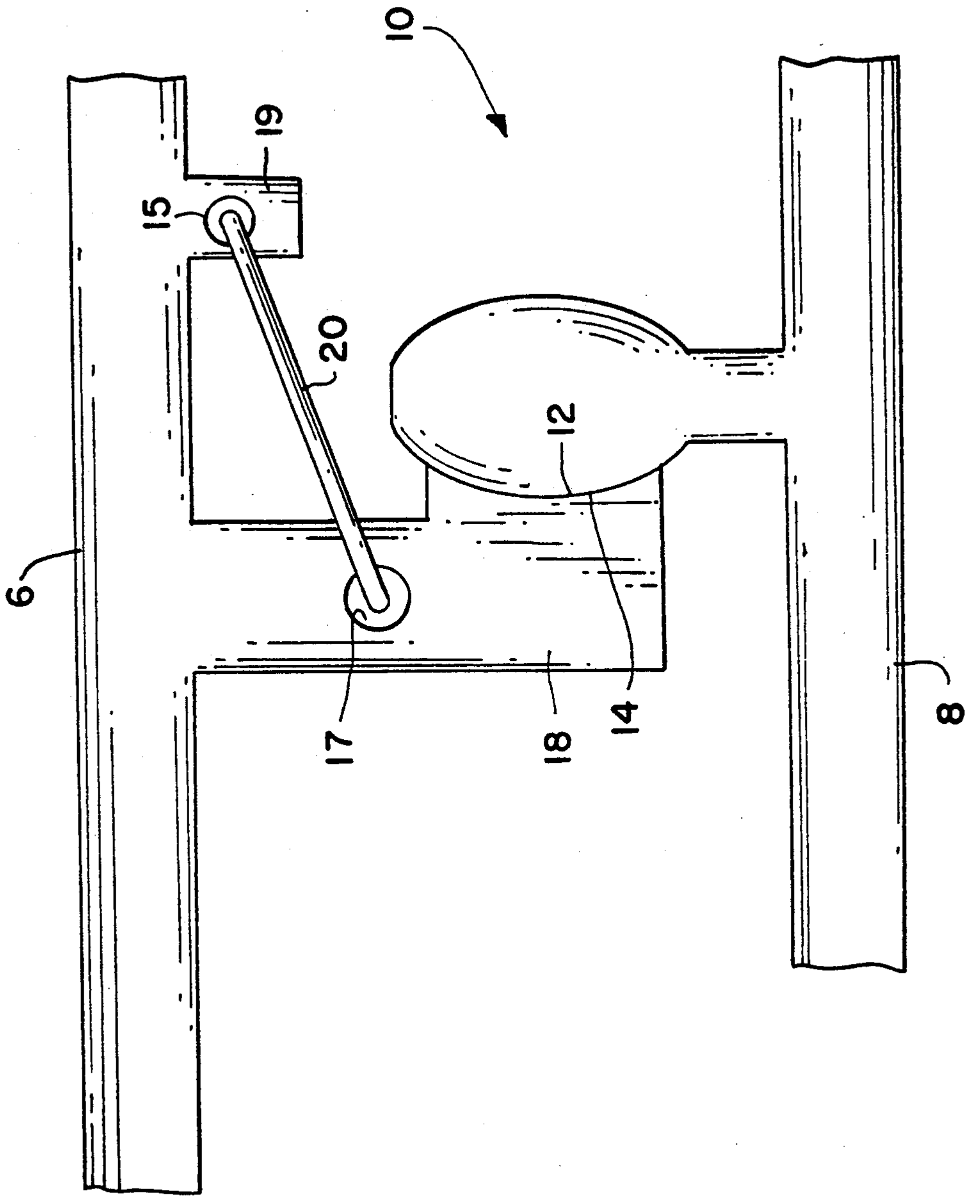
FIG. 5 is a front view of a coupling device according to the teachings of the present inventive concepts after mating.

The operation and advantages of my invention can best be understood by now referring to FIGS. 2 through 5. In FIG. 3, hot plate 6 and cold plate 8 are some distance apart, as they would be prior to joining or mating. This would be the case in a mechanical or fluid coupling, or perhaps two structural elements in outer space prior to joining or docking. Hot plate 6 and cold plate 8 are essentially at the same temperature prior to their joining. In FIG. 4, hot plate 6 and cold plate 8 are being brought closer together by some means, and in FIG. 2, hot plate 6 and cold plate 8 are in close proximity and thus hot pin 18 is placed near cold pin 16. In this configuration, hot plate 6 and cold plate 8 are still essentially at the same temperature, and can be aligned and held in this position by some mechanical or electromechanical means that would be apparent to those skilled in the art. At this point, the temperature of hot plate 6 can be allowed to elevate. The heat from hot plate 6 will raise the temperature of shape-memory actuation member 20 above its transition temperature and member 20 will contract, bending hot pin 18 towards cold pin 16 until surface 12 and 14 are joined forming the coupling and thermal interface. This condition is depicted in FIG. 5, where a high pressure contact is made between hot pin 18 and cold pin 16. The resultant thermal interface conducts the heat extremely well as heat flows from hot pin 18 into cold pin 16 and on into cold plate 8 which can be connected to a radiator, heat exchanger or conducting surface.

The values for thermal conductivity across the thermal interface are typically five to twenty times greater than prior art devices having large areas in contact.

This is because coupling device 10 uses the mounting surface area more efficiently than prior art devices. Since the conducting thermal interface on the coupling device is vertical or 90° to the mounting surface, the device can get at least four time more conducting thermal interface area than horizontal mounting surface area. This effectively multiplies the possible conduction thermal interface area by four over a prior art thermal conducting device in the same application. Also, since the coupling device 10 has little or no structure in the hot plate 6 to distribute loads, this frees the area above the thermal interface to facilitate transportation of heat to the thermal interface. And unlike prior art devices, the coupling device 10 does not have a tight surface finish requirement over a large area, since the conducting interfaces are small. This makes the conducting surfaces easier to fabricate. Also, the transition temperature of shape-memory actuation member 20 can be selected until the thermal interface is broken or the pressure is relieved at a specific temperature, which allows self regulation of the temperature of hot plate 6 (i.e., device 10 can be a temperature regulator).

In fluid couplings, coupling device 10 has no fluid passing across the thermal interface. This eliminates contamination by spillage or leakage and eliminates seals and elaborate plumbing requirements. Coupling device 10 is also a zero insertion force connector unlike prior fluid couplings. This decreases structural and latch mechanism weight overhead. The coupling device also requires no elaborate sensor scheme to insure no fluid is spilled and the connection is properly made. The hot pins protrude very little into the mating interface, requiring fine alignment over a very short distance eliminating alignment binding problems at the interface.

Figure 6:
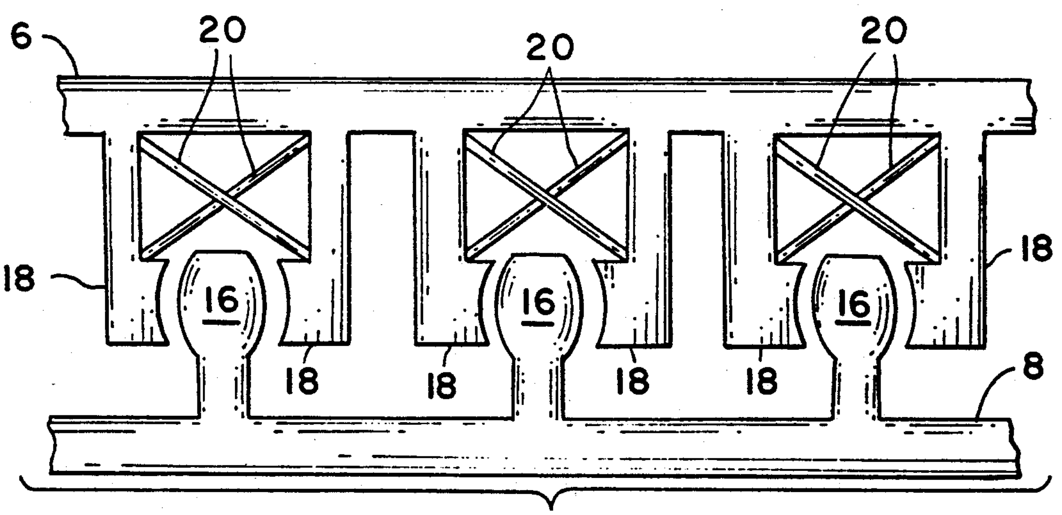
FIG. 6 is a front view of a coupling device according to the teachings of the present inventive concepts having multiple thermal interfaces.

Shown in FIGS. 2–5 is an embodiment of coupling device 10 having only one thermal interface. In an actual coupling device 10, a finite number of thermal interfaces would be required for a single coupling device 10. The number of interfaces can be varied to suit the particular application. The interfaces can be arranged in an opposing manner until no reaction force is transferred to the rest of the system. In any particular application, the interfaces would be arranged until the surface of the hot plate 6 and cold plate 8 are most efficiently used. In FIG. 6, six thermal interfaces are shown for the purpose of illustrating the above concepts. In the area shown, cold plate 8 has three cold pins 16 and hot plate 6 has six hot pins 18, i.e., each cold pin has two respective hot pins. This particular combination will thus form six thermal interfaces when the hot pins 18 join with the cold pins 16. The cold pins 16 would repeat to the left and right of the area shown until the desired number is achieved. In a coupling, the area shown would represent a segment of a cylinder for a cylindrical coupling or a segment of a line for a linear coupling.

Figure 7:
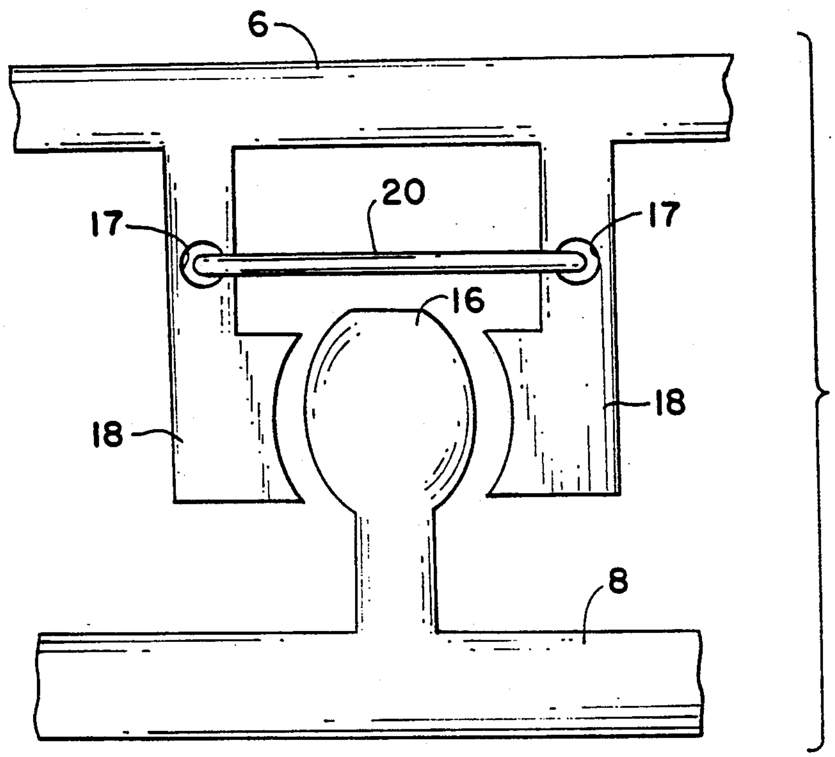
FIG. 7 is a front view of a first alternate embodiment of a coupling device according to the teachings of the present inventive concepts.
Figure 8:
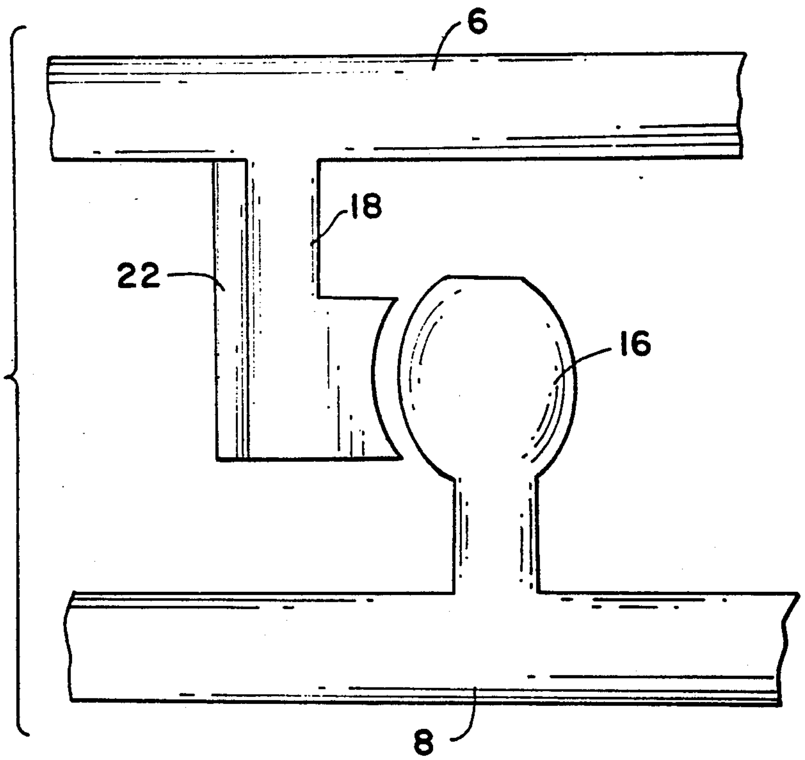
FIG. 8 is a front view of a second alternate embodiment of a coupling device according to the teachings of the present inventive concepts.

Shown in FIGS. 7 and 8 are two alternate embodiments of the coupling device. The interface shown in FIG. 7 is similar to the interface shown in FIG. 6 except that one shape-memory actuation member 20 is used instead of two shape-memory actuation members. In FIG. 8, the shape-memory actuation member is replaced by a bi-metal tine 22 which, when heated, would bend hot pin 18 towards cold pin 16.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A device for joining two objects together comprising:

at least one rigid member extending from and affixed to a first object, each said rigid member having a non-planar first surface;

at least one flexible member for each rigid member, each said flexible member extending from and affixed to a second object, and each said flexible member having a second surface complementary in shape to said first surface of said rigid member;

means for placing each rigid member near a flexible member, wherein the first surface of each rigid member is in close proximity to said complementary shaped second surface on said flexible member;

means for elevating the temperature of said second object;

means responsive to said elevated temperature of said second object for bending each said flexible member towards said rigid member, thereby causing the second surface of each said flexible member to contact the first surface of said rigid member, thereby joining said second object to said first object and transferring heat from said second object to said first object.

2. The device of claim 1 wherein said means responsive to said elevated temperature of said second object for bending each said flexible member towards said rigid member comprises an actuation member affixed between each said flexible member and said second object, said actuation member made from a shape-memory-effect alloy.

3. The device of claim 2 wherein each said rigid member extends vertically from said first object.

4. The device of claim 3 wherein said non-planar first surface is arcuate in shape.

5. The device of claim 3 wherein said actuation member comprises a wire loop.

6. The device of claim 5 wherein said wire loop is made from Nitinol.

7. The device of claim 1 further comprising at least one additional flexible member for each rigid member, said device thereby comprising a flexible member pair for each rigid member, said flexible member pair extending from and affixed to said second object, and said flexible member pair together forming a third surface complementary in shape to the shape of the first surface of each said rigid member.

8. The device of claim 7 wherein said means responsive to said elevated temperature of said second object for bending each said flexible member pair towards said rigid member comprises an actuation member affixed between each said flexible member and said second object, each said actuation member made from a shape-memory-effect alloy.

9. The device of claim 8 wherein each said rigid member extends vertically from said first object.

10. The device of claim 9 wherein each said actuation member comprises a wire loop.

11. The device of claim 10 wherein each said wire loop is made from Nitinol.

12. The device of claim 7 wherein said means responsive to said elevated temperature of said second object for bending each said flexible member pair towards said rigid member comprises an actuation member affixed between each said flexible member pair, each said actuation member made from a shape-memory-effect alloy.

13. The device of claim 12 wherein each said actuation member comprises a wire loop made from Nitinol.

14. The device of claim 1 wherein said means responsive to said elevated temperature of said second object for bending each said flexible member towards said rigid member comprises a flexible member made from at least two different metals such that when heated each said flexible member bends toward said rigid member.

* * * * *